Dec. 26, 1939.     G. E. BELLAMY ET AL     2,185,021
SEEDER
Filed Dec. 21, 1938
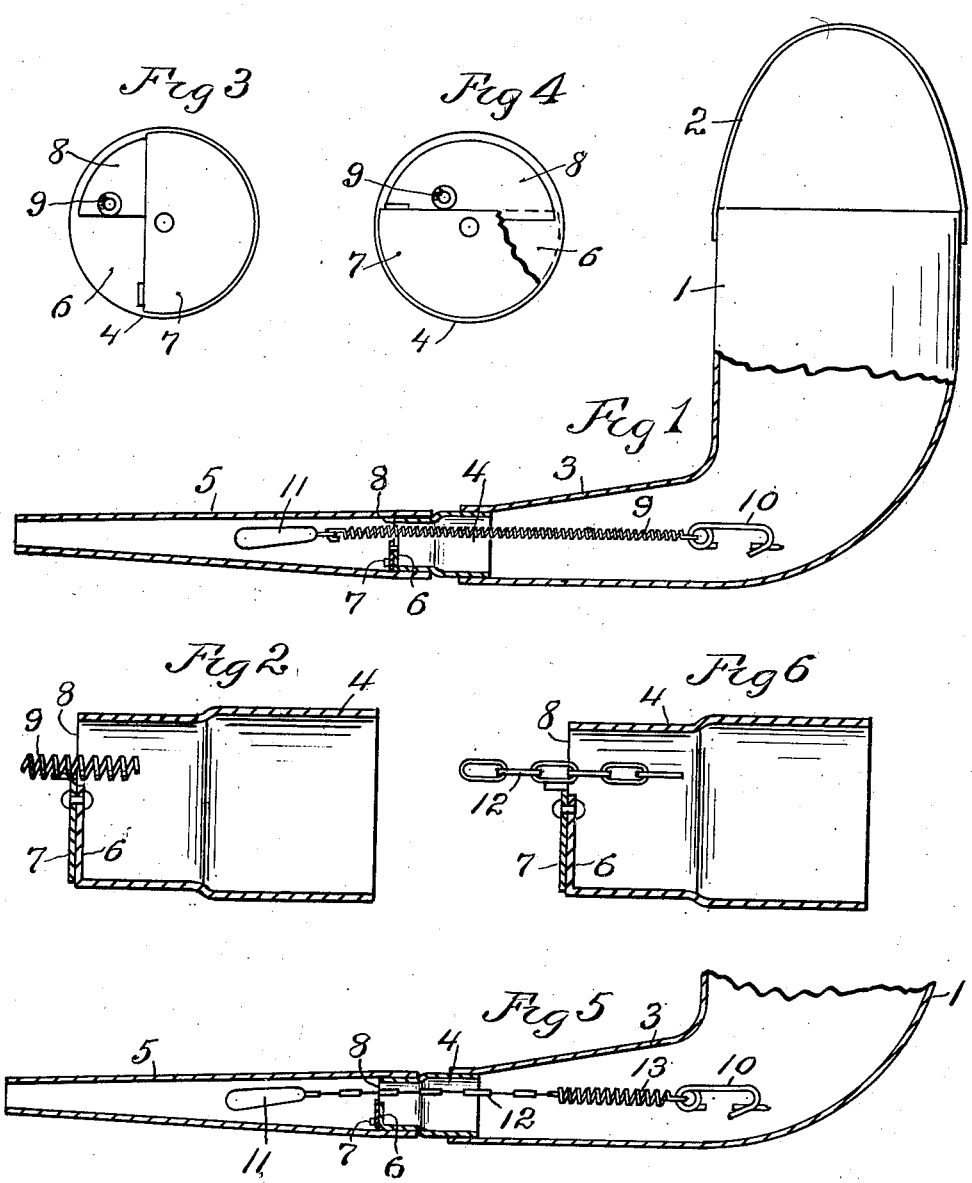

Patented Dec. 26, 1939

2,185,021

UNITED STATES PATENT OFFICE 2,185,021

SEEDER

Gervas E. Bellamy, Bethel, and Marvin C. Jett, Kansas City, Kans.

Application December 21, 1938, Serial No. 247,024

9 Claims. (Cl. 275—1)

Our invention relates to improvements in seeders. It is particularly adapted for use in connection with seeders of the type having a seed bag carried by an operator, the bag having a flexible discharge arm, and a strewing horn into which the arm discharges seed from the bag.

One object of our invention is the provision of novel agitating means, operable by the lateral oscillation of the strewing horn, for preventing the clogging of fluffy and light seed that is being strewed from the seeder horn.

Another object of our invention is the provision of a novel elongated agitating member which is resilient and extensible and contractible and having means at one end for attachment to a seeder bag, and adapted to be oscillated laterally and longitudinally by a weight attached to the free end of the agitating member, the said assemblage being adapted for insertion into a tubular discharge arm and strewing horn of a seed, whereby when the horn is oscillated, the agitating member will prevent, by its oscillation, the clogging of seed that is being strewed from the seeder.

Still another object of our invention is the provision of a seed agitating apparatus which is simple, cheap, strong, durable, not likely to get out of order, which can be easily and quickly installed in a seeder now on the market and in general use, and which, when installed, is efficient in preventing the clogging of the seed that is being strewed.

The novel features of my invention are hereinafter fully described and claimed.

In the accompanying drawing which illustrates our invention,

Fig. 1 is a side view, partly in elevation and partly in vertical section, of an ordinary seeder having mounted therein an agitating apparatus embodying a form of our invention which employs an elongated coiled spring as the agitating member.

Fig. 2 is an enlarged longitudinal sectional view of the valve tube which connects the tubular seed bag arm with the strewing horn, a portion of the coiled spring agitating member, being shown extending through the valve opening.

Fig. 3 is an end view of the valve tube, showing the valve partly opened, with the coiled spring extending through the valve opening.

Fig. 4 is a view similar to Fig. 3, showing the valve fully open and partly broken away.

Fig. 5 is a fragmentary longitudinal vertical sectional view of a seeder, such as is shown in Fig. 1, and showing mounted therein a modified form of our invention.

Fig. 6 is a view similar to Fig. 2, but showing a part of the agitator chain extending through the valve opening.

Similar characters of reference designate similar parts in the different views.

Referring to Figs. 1 to 4, 1 designates the feed bag of usual type having at its upper end a strap 2 adapted to rest on top of one shoulder of the operator. 3 designates a lateral tubular discharge arm at the lower end of the bag 1, which arm discharges seed through a connecting valve tube 4, which extends into the intake end of a usual strewing horn 5. A substantially semi-circular flange 6 partly closes the discharge end of the tube 4. A valve 7 pivoted to the flange 6, is adjustable to partly or fully close the discharge end of the tube, by being swung over the valve opening 8.

In the form shown in Fig. 1, there is provided an elongated resilient extensible and contractible agitating member, comprising an elongated coiled spring 9, which extends lengthwise into the tubular seeder bag discharge arm 3, and through the valve tube 4 into the strewing horn 5. Means for releasably attaching the inner end of the spring 9 to the bag 1, consists in a safety pin 10, attached at its ring to said inner end, and having its pin inserted through the lower portion of the bag 1, at a point in substantial axial alinement with the arm 3 and the horn 5.

The spring 9 extends through the valve opening 8 and into the horn 5, wherein it is attached to the inner end of an elongated weight 11, which is adapted, when the horn 5 is oscillated to oscillate laterally and also longitudinally, thereby causing the coiled spring 9 to oscillate with it with respect to the safety pin 10, and thereby preventing the seed, which is being discharged from the bag 1, through the arm 3, valve tube 4 and valve opening 8, from becoming clogged, in the discharge channel which converges from the lower part of the body 1 of the bag to the discharge end of the horn.

As the operator proceeds through the field swinging the horn 5 back and forth laterally, the seed will be discharged, and the weight 11 and spring 9 will swing back and forth and also reciprocate longitudinally, thereby agitating the seeds and preventing their clogging, regardless of how light and fluffy they may be.

In the modified form, shown in Figs. 5 and 6, the construction corresponds to that shown in Figs. 1 to 4, excepting that a chain 12 is attached to the weight 11, and extends through the valve opening 8 and has its inner end attached to the outer end of a short coil spring 13, which is attached to the safety pin 10. The mode of operation is the same as has been described with reference to the other form of our invention.

Other modifications of our invention, within the scope of appended claims, may be made without departing from the spirit of our invention.

What we claim is:

1. In an apparatus of the kind described, the combination with a seeder having a seed bag provided with a flexible tubular arm, and a strewing horn into which said arm discharges, of an elongated flexible member extending through said arm into said horn, means attaching the inner end of said flexible member to said bag, and a weight, in said horn, attached to the outer end of sad flexible member and adapted to oscillate laterally, when said horn is laterally oscillated.

2. In an apparatus of the kind described, the combination with a seeder having a seed bag provided with a flexible tubular arm, and a strewing horn into which said arm discharges, of an elongated longitudinally extensible and contractible resilient member extending into said arm and into said horn, means attaching the inner end of said member to said bag, and a weight attached to the outer end of said member and oscillatible laterally and longitudinally in said horn when said horn is laterally oscillated.

3. In an apparatus of the kind described, the combination with a seeder having a seed bag provided with a flexible tubular arm, and a strewing horn into which said arm discharges, of an elongated coiled spring extending into said arm and into said horn, means attaching the inner end of said spring to said bag, and a weight attached to the outer end of said spring in said horn and oscillatible laterally and longitudinally in said horn when said horn is laterally oscillated.

4. In an apparatus of the kind described, the combination with a seeder having a seed bag provided with a flexible tubular seed discharge arm, and a strewing horn into which said arm discharges, of an elongated flexible member extending into said arm and into said horn, a safety pin attached to the inner end of said member and to said bag, and a weight attached to the outer end of said member and oscillatible laterally in said horn when said horn is laterally oscillated.

5. In an apparatus of the kind described, the combination with a seeder having a seed bag provided with a flexible tubular discharge arm, and a strewing horn into which said arm discharges, of an elongated coil spring extending into said arm and into said horn, a safety pin attached to said bag and to the inner end of said spring, and a weight attached to the outer end of said spring and laterally and longitudinally oscillatible when said horn is laterally oscillated.

6. An agitator of the kind described comprising an elongated flexible member adapted for being disposed in the flexible discharge arm of a seeder bag and into a horn into which said arm discharges, means attached to one end of said member for attaching it to the seeder bag, and a weight attached to the other end of said member and adapted for disposal and oscillation in the seeder horn.

7. An agitator of the kind described comprising an elongated resilient extensible and contractible member adapted for disposal in the discharge arm and horn of a seeder bag, means at one end of said member for attaching it to the seeder bag, and a weight attached to the other end of said member and adapted for disposal and lateral and longitudinal oscillation in the seeder horn.

8. An agitator of the kind described comprising an elongated coiled spring adapted for disposal in the discharge arm and horn of a seeder bag, means at one end of said spring for attaching it to the seeder bag, and a weight attached to the other end of said spring and adapted for disposal and lateral and longitudinal oscillation in the seeder horn.

9. An agitator of the kind described comprising an elongated coiled spring adapted for disposal in the discharge arm and horn of a seeder bag, a safety pin attached to one end of said spring adapted for attachment to the seeder bag, and a weight attached to the other end of said spring and adapted for disposal and lateral and longitudinal oscillation in the seeder horn.

GERVAS E. BELLAMY.
MARVIN C. JETT.